United States Patent [19]

Kinghorn

[11] Patent Number: 4,999,706
[45] Date of Patent: Mar. 12, 1991

[54] TELETEXT DECODERS WITH INHIBIT MEANS FOR PRECLUDING OVER-WRITING CODES IN PAGE MEMORY

[75] Inventor: John R. Kinghorn, Ashtead, England

[73] Assignee: U.S. Philips Corporation, New York, N.Y.

[21] Appl. No.: 418,356

[22] Filed: Oct. 5, 1989

[30] Foreign Application Priority Data

Oct. 5, 1988 [GB] United Kingdom ............... 8823370

[51] Int. Cl.⁵ .............................................. H04N 7/08
[52] U.S. Cl. ...................................... 358/147; 358/146
[58] Field of Search ......................... 358/147, 146, 142

[56] References Cited

U.S. PATENT DOCUMENTS

| 4,679,083 | 7/1987 | Schmitz et al. | 358/147 |
| 4,698,677 | 10/1987 | Kinghorn et al. | 358/147 |
| 4,701,794 | 10/1987 | Fröling et al. | 358/147 |
| 4,719,510 | 1/1988 | Kinghorn | 358/147 |
| 4,933,764 | 6/1990 | Kinghorn | 358/147 |

FOREIGN PATENT DOCUMENTS 2149627 6/1987 United Kingdom .

OTHER PUBLICATIONS

Broadcast Teletext Sepcification, Sep. 1976, Published by British Broadcasting Corp., Incorporated Broadcasting Authority, & British Radio Equipment Manufacuter Assoc., pp. 2-20.

Primary Examiner—Victor R. Kostak
Attorney, Agent, or Firm—William Squire

[57] ABSTRACT

In a teletext decoder, the digital codes for a requested page are acquired and stored in the page memory each time the page occurs in the recurrent teletext transmission cycle. This means that the stored digital codes are over-written in the page memory on each occurrence of the page. Where an acquired digital code has been changed for a different code in the decoder so as to display a special character, this different code has hitherto been over-written periodically by the original code, giving rise to a flicker in the display at the character position concerned. The present invention prevents this flicker by arranging the decoder to look at each stored digital code before it is over-written, and preventing the over-writing from occurring when the digital code pertains to a special character.

16 Claims, 5 Drawing Sheets

Fig.1.

| RR | b4 | b3 | b2 | b1/b5 | CC b8 b7 b6 b5 | 0 0 0 0 0 | 1 0 0 0 1 | 2 0 0 1 0 | 3 0 0 1 1 | 4 0 1 0 0 | 5 0 1 0 1 | 6 0 1 1 0 |
|---|---|---|---|---|---|---|---|---|---|---|---|---|
| 0 | 0 | 0 | 0 | 0 | α BLACK | γ BLACK | (SPACE) | 0 | § | P | ` |
| 1 | 0 | 0 | 0 | 1 | α RED | γ RED | ! | 1 | A | Q | a |
| 2 | 0 | 0 | 1 | 0 | α GREEN | γ GREEN | " | 2 | B | R | b |
| 3 | 0 | 0 | 1 | 1 | α YELLOW | γ YELLOW | # | 3 | C | S | c |
| 4 | 0 | 1 | 0 | 0 | α BLUE | γ BLUE | $ | 4 | D | T | d |
| 5 | 0 | 1 | 0 | 1 | α MAGENTA | γ MAGENTA | % | 5 | E | U | e |
| 6 | 0 | 1 | 1 | 0 | α CYAN | γ CYAN | & | 6 | F | V | f |
| 7 | 0 | 1 | 1 | 1 | α WHITE | γ WHITE | ' | 7 | G | W | g |
| 8 | 1 | 0 | 0 | 0 | FLASH | CONCEAL | ( | 8 | H | X | h |
| 9 | 1 | 0 | 0 | 1 | STEADY | CONTIG γ | ) | 9 | I | Y | i |
| 10 | 1 | 0 | 1 | 0 | END BOX | SEP γ | * | : | J | Z | j |
| 11 | 1 | 0 | 1 | 1 | START BOX | NO ACTION | + | ; | K | Ä | k |
| 12 | 1 | 1 | 0 | 0 | NORMAL HEIGHT | BLACK BK GND | , | < | L | Ö | l |
| 13 | 1 | 1 | 0 | 1 | DOUBLE HEIGHT | NEW BK GND | - | = | M | Ü | m |
| 14 | 1 | 1 | 1 | 0 | NO ACTION | HOLD γ | . | > | N | ^ | n |
| 15 | 1 | 1 | 1 | 1 | NO ACTION | RELEASE γ | / | ? | O | — | o |

| 7 | 8 | 9 | 10 | 11 | 12 | 13 | 14 | 15 |
|---|---|---|---|---|---|---|---|---|
| 0 | 1 | 1 | 1 | 1 | 1 | 1 | 1 | 1 |
| 1 | 0 | 0 | 0 | 0 | 1 | 1 | 1 | 1 |
| 1 | 0 | 0 | 1 | 1 | 0 | 0 | 1 | 1 |
| 1 | 0 | 1 | 0 | 1 | 0 | 1 | 0 | 1 |
| p | @ | É | (SPACE) | 0 | é | à | i | Á |
| q | — | é | ! | 1 | ù | è | ¿ | À |
| r | ¹₄ | ä | " | 2 | à | â | ü | È |
| s | £ | # | # | 3 | £ | é | ç | Í |
| t | $ | ¤ | $ | 4 | $ | ï | $ | Ï |
| u | ☰ | ☲ | % | 5 | ã | Ã | a | Ó |
| v | ☷ | ● | & | 6 | ō | Õ | o | Ò |
| w | ? | ◆ | ' | 7 | · | ç | Ñ | Ú |
| x | ‖ | ö | ( | 8 | ò | ô | ñ | æ |
| y | ³₄ | å | ) | 9 | è | û | é | Æ |
| z | ÷ | ü | * | : | ì | ç | à | ð |
| ä | ← | Ä | + | ; | ° | ë | á | Ð |
| ö | ¹₂ | Ö | , | < | ç | ê | é | ø |
| ü | → | Å̸ | — | = | → | ù | í | Ø |
| β | ↑ | Ü | . | > | ↑ | î | ó | b |
| ■ | # | — | / | ? | # | # | ú | p |

224 DISP

TELETEXT DECODERS WITH INHIBIT MEANS FOR PRECLUDING OVER-WRITING CODES IN PAGE MEMORY

BACKGROUND OF THE INVENTION

1. Field of the Invention

This invention relates to teletext decoders for receiving, storing and processing teletext information in the form of digitally coded data which represents a recurrent transmission cycle of available teletext pages.

2. Description of the Prior Art

A teletext decoder which is suitable for producing character display signals for a teletext display page includes an acquisition circuit for acquiring digital codes representing teletext information for the page, a page memory for storing the acquired digital codes at individual page memory locations, and a character generator for producing the character display signals in accordance with the stored digital codes.

Conventionally, the character generator includes a character memory in which is stored character information representing the character shapes which are available for display. The character memory is addressed selectively using the digital codes store din the page memory to produce the character display signals. The character information for each character shape is stored in at least one individual character memory location which is addressable by a respective digital code.

Current transmission of teletext information are in broadcast television signals. Such teletext transmissions in the United Kingdom are essentially only in the English language, and a character generator which is used with these transmissions includes a character memory containing the character information for an English language character set. Where teletext transmissions are provided in a country whose national language uses a different character set, a character generator which is used with these latter transmission can include a dedicated character memory containing the character information for a character set for the language concerned.

The character requirements of the major European languages differ only in a few (about 11) national use character options. Therefore, these requirements can be met by a single composite character memory containing the character information for a common character set and for a plurality of national option character sub-sets, each of which sub-sets forms with the common character set a complete language character set for a respective language.

In current teletext transmissions, control information which forms part of the teletext information for a page identifies which language character set should be used to display the page. Where a teletext decoder has a character generator with a character memory containing, as aforesaid, the character information for a common character set and for a plurality of national option character sub-sets, this control information is used in the teletext decoder to select a particular sub-set from those which are available and thereby in effect select a single language character set.

As is known from Applicants GB patent specification No. 2 149 627, a small group of the total number of the possible digital codes representing the teletext information may be allocated in common for identifying different character shapes in several national option character sub-sets, the character information for each sub-set being stored in a respective block of character memory locations. The control information is used to determine which block is to be addressed in respect of acquire digital codes belonging to this small group. These acquire digital codes as stored in the page memory are used to address memory locations in the selected block, code conversion being carried out when these digital codes are read out from the page memory to convert them into the appropriate codes for this addressing as a result of the control information.

The selection of a particular one of several national option character sub-sets by means of the control information has the limitation that it is possible to display characters from only one of the sub-sets on a single page, so that it may not be feasible to display a page in which more than one language is to be used, or languages that require more characters than can be accommodated in one national option character sub-set of given size.

In order to overcome this limitation, a teletext decoder may be adapted to substitute a different code for any one or more of the codes which have been acquired and stored in the page memory in respect of a requested page. A substituted code can be appropriate for addressing a character memory location in any of the blocks containing the character information for the sub-sets. To achieve this digital code substitution in the page memory, extension data packets which form part of the teletext information for a page are received and stored in the page memory along with the basic teletext information for a requested page. An extension data packet comprises a number of groups of ancillary control information, one group for each character code to be substituted. Each group comprises three items of data. The first item identifies a character position in the page, the second item specifies the change to be effected, and the third item specifies the character to which the change is to be applied. The teletext decoder determines from the second and third items the digital code which is used to address the character memory location containing the character information for the "new" character shape concerned. This digital code is then substituted for that originally stored in the page memory location which corresponds to the identified character position in the page.

It is a common practice to arrange teletext decoders to operate in such a manner as to acquire the digital codes for a requested page repeatedly from the recurrent cycle of transmitted teletext pages for as long as the page is being requested, and to refresh the contents of the page memory by over-writing the previous contents each time these digital codes are acquired. With this mode of operation, a page memory location in which digital code substitution is to occur, as aforesaid, will have the substituted digital code over-written by the original digital code each time the page memory contents are refreshed. Typically, the recurrent cycle of transmitted teletext pages may be repeated every 20 seconds. As a consequence, in a displayed page the character shape identified by the original digital code is displayed momentarily each time the page memory contents are refreshed until the substitution of the original digital code by digital code for the "new" character shape is effected. This situation therefore gives rise to an undesirable flicker at the character position concerned in the displayed page.

SUMMARY OF THE INVENTION

It is an object of the present invention to provide a teletext decoder which is adapted to operate in a manner which avoids this undesirable effect.

According to the invention a teletext decoder for teletext information comprising pages which are transmitted in a recurrent cycle includes, means for selecting a page, an acquisition circuit for acquiring digital codes representing the teletext information for the selected page on each occurrence thereof in the recurrent cycle of pages, a page memory for storing the acquired digital codes at individual page memory locations, addressing means for addressing the page memory locations, and writing means for writing the acquired digital codes into the page memory locations when they are addressed, said teletext decoder being characterized by further including detection means for detecting the presence in an addressed page memory location of any one of a number of selected digital codes, and inhibiting means responsive to the detection of such a selected digital code to prevent the over-writing of that code by a subsequently acquired digital code which would otherwise have been written into the addressed page memory location.

In a teletext decoder according to the invention, the selected digital codes can be those used to address the character memory locations in the character memory that contain the character information for the "special" character shapes required for the national option character sub-sets. These "special" character shapes, when displayed, are therefore not replaced momentarily by another character shape each time the contents of the page memory are refreshed, so that the flicker effect is avoided. Of course, each time the contents of the page memory are refreshed, the data in the extension data packet that identifies the page memory location and digital code for a "special" character shape, causes this digital code to be over-written by the same digital code each time the contents of the page memory are refreshed. However, this is of no consequence and does not affect the performance of the invention.

A proposed embodiment of the present invention is characterized in that the selected digital codes are those codes whose most significant bit has a particular one logic value.

Normally, a teletext decoder may have in its operation a plurality of write memory cycles in which a number of page memory locations are addressed in turn to permit writing of a digital code into each addressed memory location, and a plurality of read memory cycles in which the same page memory locations are again addressed in turn in respective cycles to permit read out of the digital code from each addressed memory location. For the performance of the invention, the operation of the teletext decoder is modified by making each of the write memory cycles a read-then-write memory cycle. This allows the contents of each page memory location to be interrogated to determine whether or not it can be written into ion the current write memory cycle.

IN THE DRAWING

In order that the invention may be more fully understood reference will now be made by way of example to the accompanying drawings, of which.

DESCRIPTION OF THE PREFERRED EMBODIMENT

Figure 1:
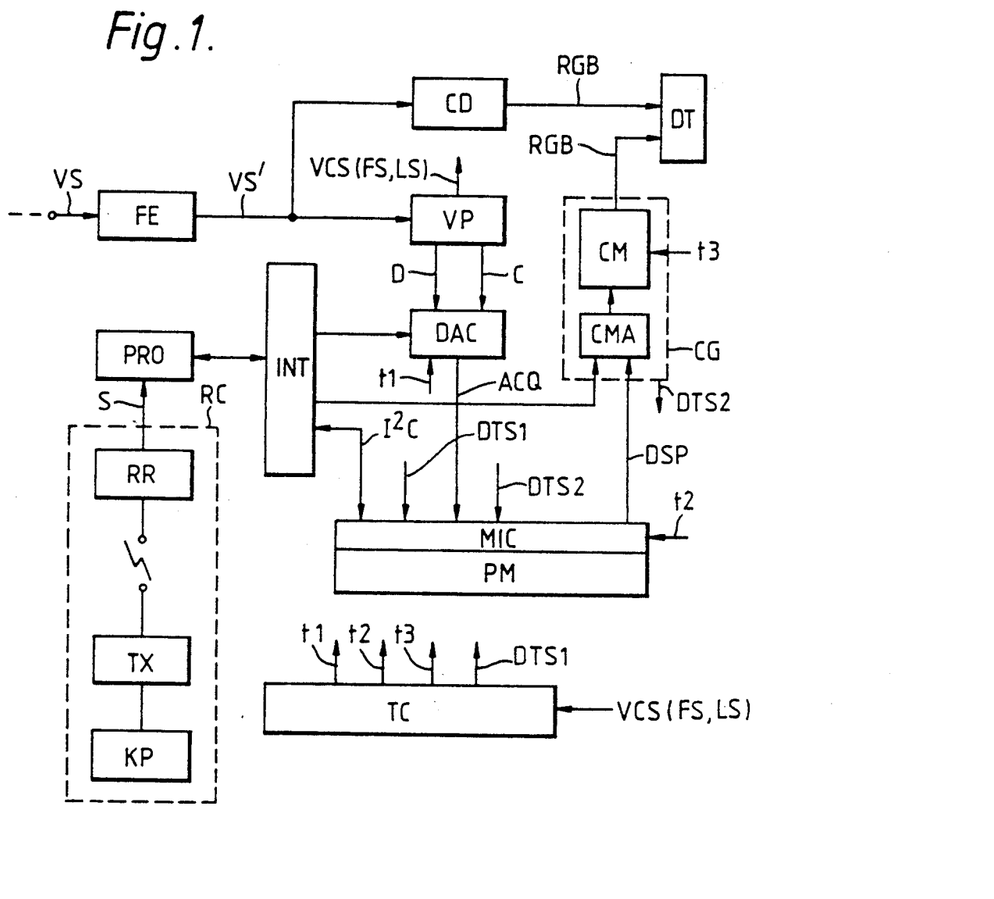
FIG. 1 is a block diagram of a teletext television receiver including a teletext decoder according to the invention.

Referring to the drawings, the teletext television receiver shown in FIG. 1 comprises video and data processing circuits for receiving and displaying both normal picture information and teletext information. The front end FE of the receiver comprises conventional amplifying, tuning and intermediate frequency detector circuits, and is connected to receive an incoming television video signal VS. For normal picture display by the television receiver, the demodulated video signal VS' is applied to a colour decoder which produces the RGB component signals for the picture display. Time base circuits for a display device DT (e.g. a CRT) receive the usual line and field synchronising pulses from a separator circuit which extracts these synchronising pulses from the video signal VS'. The element CD represents the colour decoder and these other circuits which are provided for normal picture display.

The demodulated video signal VS' is also applied to a teletext decoder section of the television receiver that deals with the reception and display of alpha-numeric text and other teletext information which is received as digitally coded data. This section comprises a video processor circuit VP, a data acquisition circuit DAC, a character generator CG and a page memory PM. The video processor circuit VP performs inter alia data slicing for retrieving teletext data pulses D from the video signal VS', together with input data clock pulses C which are derived from the data pulses D. The data pulses D and the clock pulses C are fed to the data acquisition circuit DAC which is operable to feed selected groups of the teletext data pulses over an acquisition connection ACQ to a page memory interface circuit MIC as digital codes representing address, display and control information. The page memory PM, which has a capacity for storing the display and control information for at least one teletext display page, stores the acquired display and control information as digital codes at respective memory locations as determined by the accompanying address information.

A logic processor PRO controls the operation of the teletext decoder section via a processor interface circuit INT. As part of this control, the processor PRO is operable in accordance with page select signals S applied to it from a remote control arrangement RC to determine which teletext information is acquired by the data acquisition circuit DAC. The arrangement RC has a receiver part RR and a remote transmitter part comprising a transmitter TX and a keypad KP. As another part of its control, the processor PRO is operable to access the page memory PM over a connection I²C to read out from the page memory PM the stored digital codes for application via a connection DSP to the character generator CG. The character generator CG is responsive to the applied digital codes to produce RGB component signals for displaying the selected page. The character generator CG comprises a character memory CM and an associated addressing circuit CMA. Character information representing the character shapes which are available for display are stored in the character memory CM which is selectively addressed by the addressing circuit CMA in accordance with the digital codes applied to the character generator CG from the page memory PM. The character information for each character shape is stored in at least one individual character memory location which is addressable by a respective one of the digital codes. Only a portion of the character information for a character shape is read out of any one time, which portion is displayed in a current scanning line of the display. A timing circuit TC provides timing signals on connections t1 to t3 for the circuit elements DAC, CG and MIC. The timing circuit TC and the character generator CG also supply to inputs DTS1 and DTS2 display timing signals which are used to address the page memory PM via the memory interface circuit MIC to read out the stored digital codes for display purposes independently of the processor PRO. The operation of the timing circuit TC is synchronised with the received video signal VS by a composite signal VCS which contains the line (LS) and field (FS) synchronising pulses as separated from the demodulated video signal VS' in the video processor VP.

In the teletext television receiver shown in FIG. 1, only single line connections have been shown for the interconnections between the various circuit elements for the sake of simplicity. However, it will be apparent to a person skilled in the art that in practice many of these interconnections would be multi-line. For instance, whereas the teletext data pulses D retrieved from the video signal VS' are applied serially to the data acquisition circuit DAC over a single line connection, serial-to-parallel conversion takes place within this circuit DAC, so that the connection ACQ is a multi-line connection for supplying the groups of teletext data pulses to the page memory PM.

Although a composite television receiver for receiving both normal picture information and teletext information is exemplified in FIG. 1, it will be appreciated that the teletext decoder section for teletext information acquisition together with the front end FE may be provided as a separate teletext decoder which is adapted to feed a display monitor or a conventional television receiver.

For the present purposes, it will be assumed that the teletext information to be processed by a teletext decoder embodying the present invention conforms to the specification laid down in the document "Broadcast Teletext Specification", September 1976, published jointly by the British Broadcasting Corporation, Independent Broadcasting Authority and British Radio Equipment Manufacturers' Association. In this document, a quantity of teletext information to be considered as an entity is termed a page, as already mentioned. All of the pages which are available are normally transmitted in a recurrent cycle, with or without up-dating page information, as appropriate. The pages are numbered and the teletext decoder is operable to select any page by number and the digital codes representing the page information are acquired by the teletext decoder from the cyclic transmission and stored in the page memory for as long as the page is required. The page information comprises digital codes representing display and control information and addresses for up to 24 display rows each having 40 character positions. The first display row (Row 0) of each page is termed a page-header and contains inter-alia the page number. The page information for a page can also include one or more extension data packets which are received and stored in the page memory along with the basic display information for the page concerned. As mentioned previously, such an extension data packet can be used to change the character which is to be displayed at a particular character position, which change leads to the problem of flicker which the present invention avoids.

The data acquisition circuit DAC receives the acquired digital codes representing the display and control characters in the form of 8-bit codes b1 to b8 of which seven bits b1 to b7 of each code represent a display character or a control character and the eighth bit is a parity bit. The parity bit is used to test for odd parity and is stripped off each received code which, if its parity checks out, is stored in the page memory pM with its eighth bit b8 re-instated as the most significant bit but initially always as a logic 0. The addresses provided by the data acquisition circuit DAC from other digital codes in the received page information identify the memory location in the page memory PM where the character codes are to be stored. Under the control of the processor PRO, the 8-bit character codes b1 to b8 are read out from the page memory PM and applied in the character generator CG to the addressing circuit CMA which uses these applied codes to address the character memory CM to produce the RGB components signals for character display.

Figure 2A:
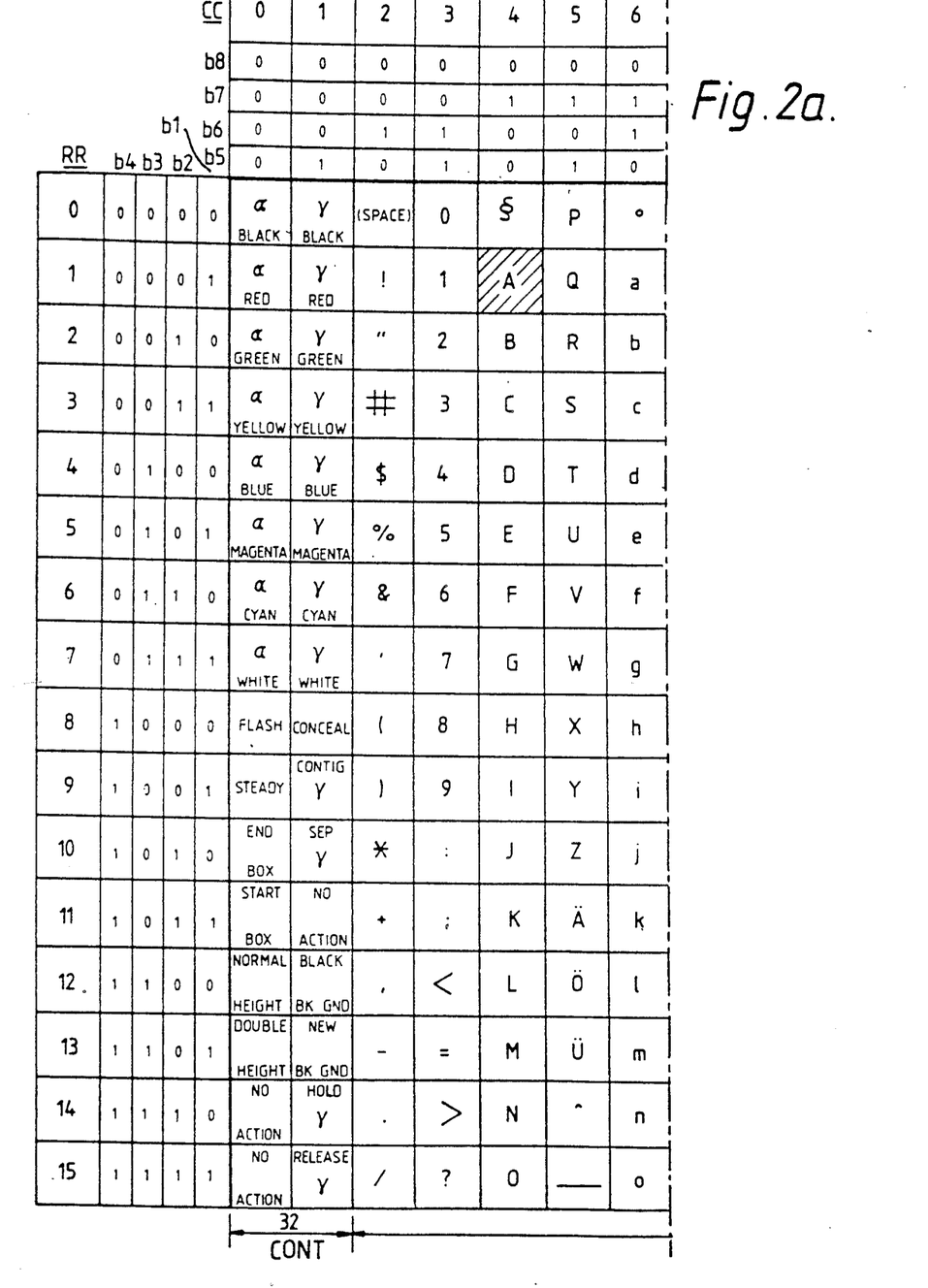
FIGS. 2a and 2b show a table of character shapes and addressing codes of a character memory which is suitable for a teletext decoder according to the invention.
Figure 2B:
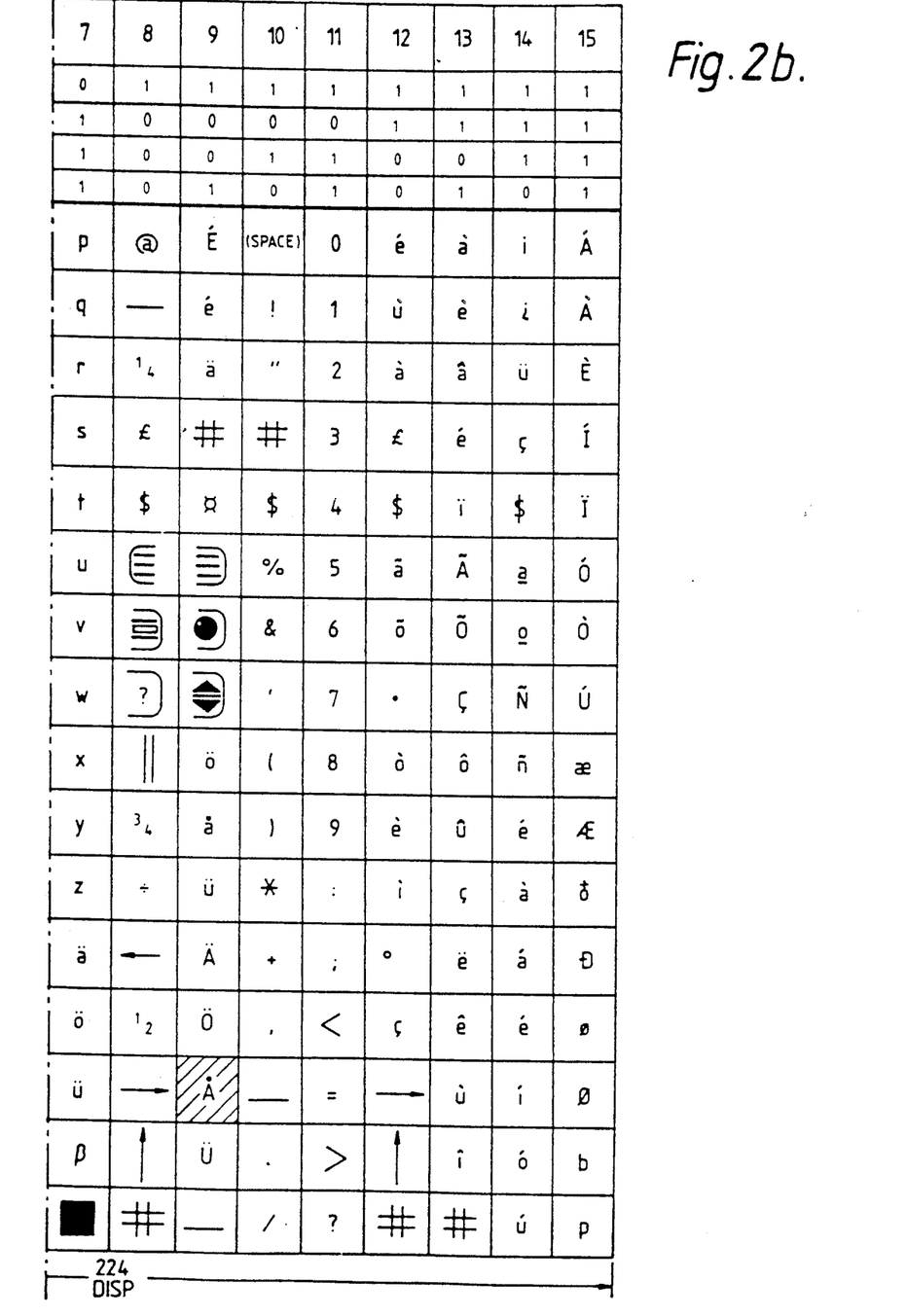

The actual character information which is stored in the character memory Cm represents the available character shapes for display. The character shapes, together with so-called control characters which control various display functions, are shown in the memory map table of FIGS. 2a and 2b. This table comprises 256 character positions arranged in matrix form in 16 rows RR and 16 columns CC. These character positions, or more precisely their contents, are identified by respective digital codes comprising eight bits b1 to b8. The 32 character positions in the first two columns 0 and 1 contain respective control characters CONT which are assumed to correspond to those given in the document "Broadcast Teletext Specification". These control characters control the display facilities and are not actually stored in the character memory CM. The character positions of the remaining columns 2 to 15 contain respective display characters DISP. The character positions in the eight columns CC0 to CC7 are addressed with respective 8-bit digital codes in which the most significant bit b8 has the logic value 0. These codes, which constitute the received teletext information, are effective 7-bit codes which are stored in the page memory as received with the parity bit b8 initially stripped off but reinstated with the logic value 0, as aforesaid. The character positions in the other eight columns CC8 to CC15 are addressed with respective 8-bit digital codes in which the most significant bit b8 has the logic value 1. Therefore, these codes cannot be codes which are actually received as teletext information directly and they have to be produced within the decoder itself. One means of achieving this is to include in the addressing circuit CMA a code converter which is operable to convert certain of the digital codes having bit b8 of logic value 0 into other digital codes having bit b8 of logic value 1. This code conversion is under the control of control bits which are transmitted in the page header of a page of teletext information, and will not be considered further because it is not pertinent to the present invention.

Another means of effecting the code conversion, with which the present invention is concerned, is to substitute digital codes which have been acquired in respect of a selected page and stored in the page memory PM, with different digital codes. This substitution is effected by the processor PRO in accordance with ancillary control information contained in extension data packets which are received and stored in the page memory PM along with the other acquired teletext information for a selected page.

As mentioned previously, an extension packet comprises a number of groups of information, one for each digital code to be substituted. Each group contains three items of data. The first item identifies a character position in the page where a displayed character is to be changed, the second item is a description of the change to be effected, and the third item identifies the character to which the change is to be applied. For example, say the digital code 01000001 for the character shape A is stored in the page memory PM. A teletext decoder without processor conversion facilities will usefully display this character shape A at the relevant character position in the display. However, the displayed character shape should ideally be Å, and ancillary control information to this effect is contained in a received extension data packet associated with the display page. The processor PRO accesses this ancillary control information of which the first item identifies the character position which is the address of the memory location in the page memory PM in which the code 01000001 for the character shape A is stored. The second item of the ancillary control information identifies the symbol °, and the third item identifies the character shape A to which this symbol is to be applied. In response to this further control data, the processor PRO writes the digital code 10011101 for the character shape Å into the page memory PM at the identified memory location. Thus, when the page information is next read out from the page memory PM for display purposes, the character memory location which contains the character information for the character shape Å will be addressed directly by the code 10011101 by the addressing circuit CMA. The character positions for the character shapes A and Å are shown shaded in FIGS. 2a and 2b.

The page information for a selected page as stored in the page memory PM is refreshed periodically each time it occurs in the recurrent transmission cycle of the teletext pages. Therefore, each time the page information is received, a digital code which has been substituted for an original digital code is overwritten by the original digital code in the relevant byte location. In turn, the original digital code is subsequently overwritten by the substituted digital code by the processor response to the ancillary control information in the extension data packet. This alternate substitution of the two digital codes will result in a flicker in the display of the different character shapes (e.g. A and Å) concerned, alternately, unless in accordance with the invention measures are taken to prevent the overwriting of the substituted digital code by a subsequent acquisition of the original digital code.

Figure 3:
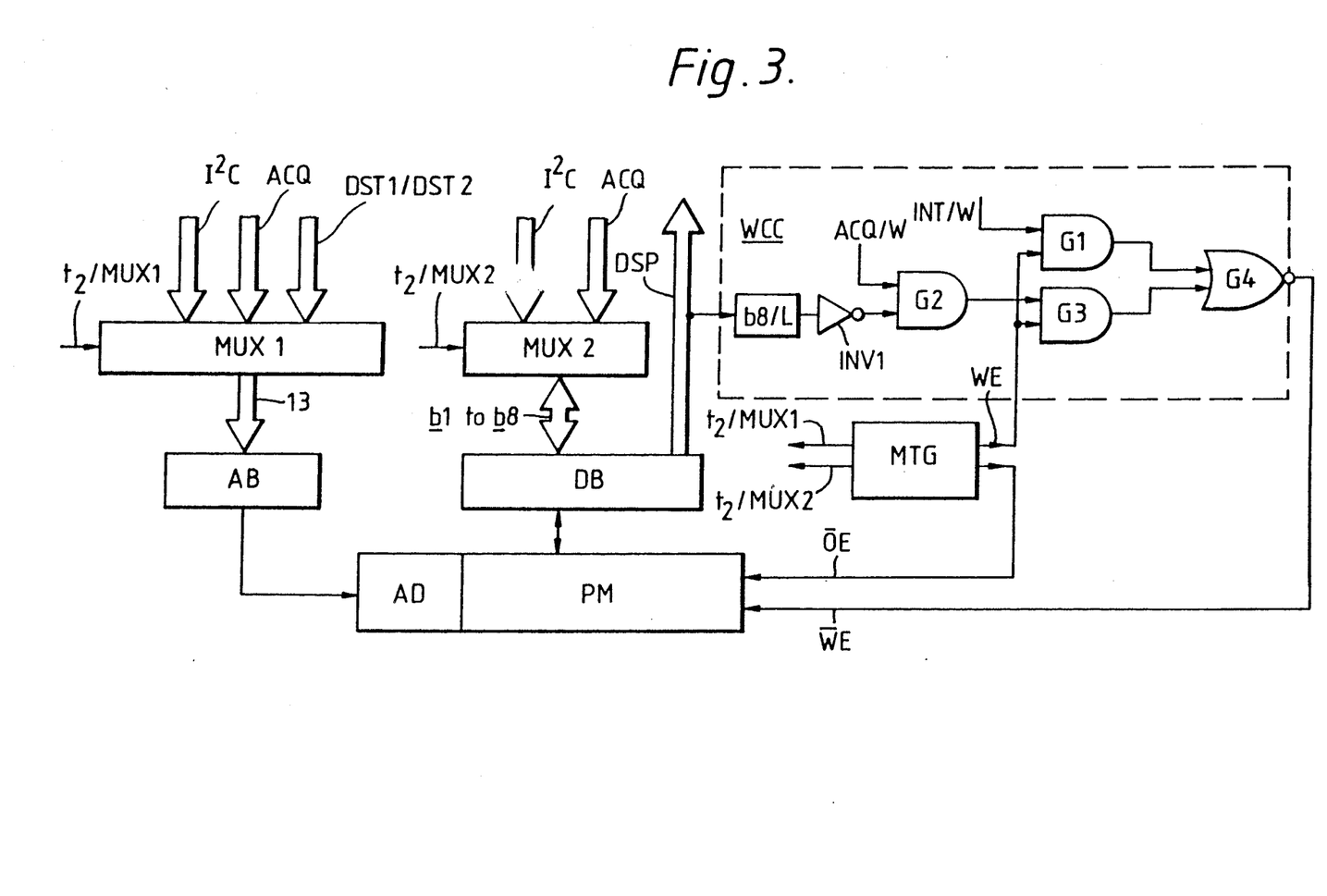
FIG. 3 is a block diagram showing elements of the teletext decoder for implementing the invention.

Conveniently, these measures are provided by circuit elements in the page memory interface circuit MIC as shown in FIG. 3. The interface circuit MIC includes inter alia a first multiplexer MUX1 via which address codes (e.g. of 13 bits) are supplied to an address buffer AB from the interface circuit INT via the connection I$^2$C, from the data acquisition circuit DAC via the connection ACQ, or from the timing circuit TC and the character generator via the connections DTS1 and DTS2. Timing signals t$_2$/MUX1 from a memory timing generator MTG determine from which of the three sources, address codes are supplied to the address buffer AB at any given time. An address decoder AD associated with the page memory PM receives the address codes from the address buffer AB. A second multiplexer MUX2 supplies 8-bit digital codes b1 to b8 to a data buffer DB from the interface circuit INT or from the data acquisition circuit DAC, via the connections I$^2$C or ACQ, respectively. Timing signals t$_2$/MUX2 from the memory timing generator MTG determine from which of these two sources digital codes are supplied to the data buffer DB at any given time. The page memory PM receives the digital codes from the data buffer DB for storage in the addressed memory locations. Digital codes read from addressed memory locations of the page memory PM are supplied via the data buffer DB over the connection DSP to the character generator CG.

The writing into and reading from the page memory PM is under the control of write and read control signals $\overline{WE}$ and $\overline{OE}$ which are supplied by the memory timing generator MTG. These control signals $\overline{WE}$ and $\overline{OE}$ occur in page memory operating cycles which are alternately write cycles WC and read cycles RC as shown in diagram (a) of FIG. 4. In a particular implementation of a teletext decoder in which the present invention can be embodied, there are 128 page memory operating cycles in each television line period of 64μS, the alternate write cycles and read cycles each having a period of 500 nanoseconds. As shown in diagram (b) of FIG. 4, a 13-bit page memory address ADD A0-A12 occurs in each page memory operating cycle and has a valid period ADD/V for most of the cycle period.

Figure 4:
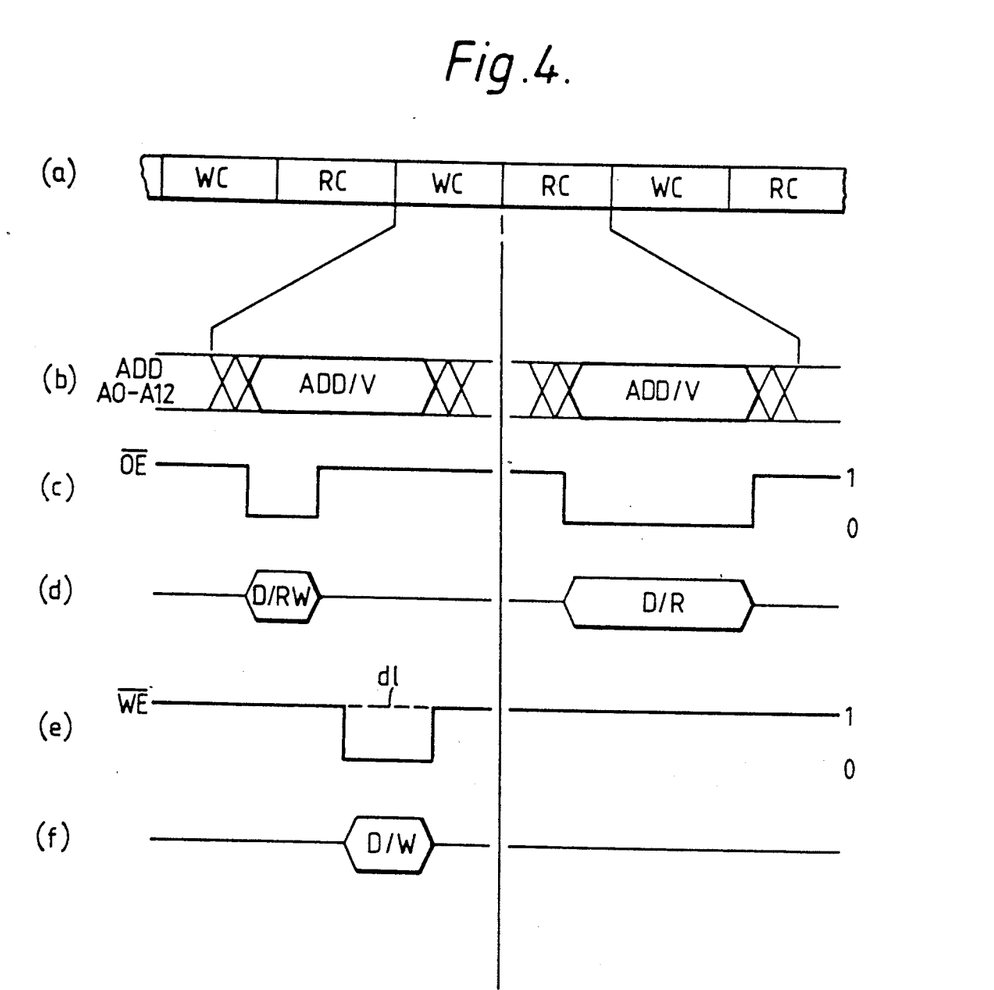
FIG. 4 shows various waveforms which relate to the operation of the teletext decoder elements shown in FIG. 3.

In each read cycle RC, the read control signal $\overline{OE}$ (diagram (c)) assumes an active logic level 0 for most of the period that the page memory address is valid. As shown in diagram (d), valid data D/R comprising a digital code is read from an addressed memory location of the page memory PM into the data buffer DB for the period that the read control signal $\overline{OE}$ has the active logic level 0.

The read control signal $\overline{OE}$ also assumes the active logic level 0 for an initial short period in each write cycle WC, during which short period valid data D/RW is read from the addressed memory location. As will be described, depending on the content of the addressed memory location, the write control signal $\overline{WE}$ will assume or not assume, an active logic level 0 for a subsequent period in the same write cycle WC. Therefore, as shown in diagram (f), valid data D/W comprising a digital code to be written into the addressed memory location is actually written or not written in this subsequent period. The dotted line d1 in the waveform for the write control signal $\overline{WE}$ signifies the possible maintenance of the non-active logic level 1.

Returning to FIG. 3, the write control signal $\overline{WE}$ is applied to the page memory PM from a write control circuit WCC which receives an inverse write control signal WE from the memory timing generator MTG. The write control circuit WCC comprises three ANDgates G1, G2 and G3 an inverter INV1, a NOR-gate G4 and a latch b8/L. A first input of the gate G1 is connected to receive the inverse write control signal WE, and a second input of this gate is connected to receive a write signal INT/W from the processor PRO when data from the processor PRO is to be written into the page memory PM via the interface INT. The gate G1 is opened when these two signals are present, and the gate G4 connected at the output of this gate applies the write control signal $\overline{WE}$ to the page memory PM. Data D/W in the data buffer DB can then be written into the page memory PM.

When data is to be written into the page memory PM from the data acquisition circuit DAC instead of from the processor PRO, a write signal ACQ/W is produced by the circuit DAC and applied to one input of the AND-gate G2. A second input of the gate G2 is connected to the output of the inverter INV1 which has its input connected to the output of the latch b8/L. The output of the gate G2 is connected to one input of the AND-gate G3. The other input of the gate G3 is connected to receive the inverted write control signal WE. Therefore, in this instance, the write control signal $\overline{WE}$ is applied to the page memory PM when the gate G3 has an active logic level 1 at its output. This latter condition obtains when the signal WE is present and when the output of the gate G2 has a logic level 1 at both inputs. The latch b8/L has latched into it the logic value of the bit b8 in the memory location of the page memory currently being addressed, this latching being effected during the active period of the read control signal $\overline{OE}$ that occurs in the write cycle. Thus, when a digital code stored in an addressed memory location has its bit b8 of logic value 0, the inverter INV supplies a logic level 1 to the gate G2 so that this code can be over-written by a fresh digital code in any write cycle. However, when the bit b8 is of logic value 1 in a write cycle in which data acquisition occurs, the output of the gate G2 assumes a logic level 0, so that the output of gate G3 remains at logic level 0 and the write control signal $\overline{WE}$ is not produced. Therefore, when a page memory memory location has stored therein any one of the digital codes corresponding to the character shapes contained in any one of columns CC8 to CC15 of the character table of FIGS. 2, 2a and 2b, this stored digital code will not be over-written during data acquisition, and the display of the character shape concerned will thus be maintained, thereby preventing flickering of the displayed character at the character position. Conveniently, the latched logic level for the bit b8 in the latch b8/L is over-written each time a new page memory memory location is addressed.

It is mentioned that this operation to prevent flickering does not prevent all the memory locations of the page memory being "cleared to space" each time a new page is selected for acquisition. More specifically, when a new page is selected, the decoder can be arranged to write the digital code 00100000, which represents a space, into every memory location of the page memory. This has the effect of displaying only spaces, thereby blanking the display. If a byte location has stored in it a digital code with a bit b8 of logic level 1, then overwriting this code with the space code might be prevented by the write control circuit WCC. However, this is not the case because the write cycle used for this memory clearing is not deemed an acquisition cycle the write signal ACQ/W is not produced, with the result that gage G2 remains closed. It is the write cycle INT/W which is used for memory clearing.

From reading the present disclosure, other modifications will be apparent to persons skilled in the art. Such modifications may involve other features which are already known per se and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation or modification thereof which would be apparent to persons skilled in the art, whether or not it relates to the same invention as presently claimed in any claim and whether or not it mitigates any or all of the same technical problems as does the present invention.

What is claimed is:

1. A teletext decoder for teletext information comprising pages which are transmitted in a recurrent cycle; said teletext decoder including means for selecting a page, an acquisition circuit for acquiring digital codes representing the teletext information for the selected page on each occurrence thereof in the recurrent cycle of pages, a page memory for storing the acquired digital codes at individual page memory locations, addressing means for addressing the page memory locations, and writing means for writing the acquired digital codes into the page memory locations when they are addressed; and said teletext decoder being characterised by further including detection means for detecting the presence in an addressed page memory location of any one of a number of selected digital codes, and inhibiting means responsive to the detection of such a selected digital code to prevent the over-writing of that code by a subsequently acquired digital code which would otherwise have been written into the addressed page memory location.

2. A teletext decoder as claimed in claim 1, characterised in that the selected digital codes are those codes whose most significant bit has a particular one logic value.

3. A teletext decoder as claimed in claim 1, comprising means for defining a plurality of write memory cycles in which a number of page memory locations are addressed in turn in respective cycles to permit writing of a digital code into each addressed memory location, and a plurality of read memory cycles in which the same page memory locations are again addressed in turn in respective cycles to permit read out of the digital code from each addressed memory location, characterised in that each of the write memory cycles is a read-then-write memory cycle to allow the contents of each page memory location to be interrogated to determined whether it can be written into in that write memory cycle.

4. A teletext decoder as claimed in claim 1 characterised by comprising a write control circuit having latching means for latching the logic value of the most significant bit of a digital code read out from an addressed memory location in a write cycle, and gating means connected to receive said logic value of the most significant bit and a write signal signifying that said write cycle is an acquisition cycle in which a digital code can be written into the page memory from said data acquisition circuit, said gating means being operable to apply to write control signal to the page memory to allow the applied digital code to be written into the addressed memory location only when said logic value signifies that the digital code currently stored in the memory location can be over-written.

5. A television receiver embodying a teletext decoder as claimed in claim 1.

6. A teletext decoder as claimed in claim 2, comprising means for defining a plurality of write memory cycles in which a number of page memory locations are addressed in turn in respective cycles to permit writing of a digital code into each addressed memory location, and a plurality of read memory cycles in which the same page memory locations are again addressed in turn in respective cycles to permit read out of the digital code from each addressed memory location, characterized in that each of the write memory cycles is a read-then-write memory cycle to allow the contents of each page memory location to be interrogated to determined whether it can be written into in that write memory cycle.

7. A teletext decoder as claimed in claim 2, characterized by comprising a write control circuit having latching means for latching the logic value of the most significant bit of a digital code read out from an addressed memory location in a write cycle, and gating means connected to receive said logic value of the most significant bit and a write signal signifying that said write cycle is an acquisition cycle in which a digital code can be written into the page memory from said data acquisition circuit, said gating means being operable to apply a write control signal to the page memory to allow the applied digital code to be written into the addressed memory location only when said logic value signifies that the digital code currently stored in the memory location can be over written.

8. A teletext decoder as claimed in claim 3, characterized by comprising a write control circuit having latching means for latching the logic value of the most significant bit of a digital code read out from an addressed memory location in a write cycle, and gating means connected to receive said logic value of the most significant bit and a write signal signifying that said write cycle is an acquisition cycle in which a digital code can be written into the page memory from said data acquisition circuit, said gating means being operable to apply a write control signal to the page memory to allow the applied digital code to be written into the addressed memory location only when said logic value signifies that the digital code currently stored in the memory location can be over-written.

9. A teletext decoder as claimed in claim 6, characterized by comprising a write control circuit having latching means for latching the logic value of the most significant bit of a digital code read out from an addressed memory location in a write cycle, and gating means connected to receive said logic value of the most significant bit and a write signal signifying that said write cycle is an acquisition cycle in which a digital code can be written into the page memory from said data acquisition circuit, said gating means being operable to apply a write control signal to the page memory to allow the applied digital code to be written into the addressed memory location only when said logic value signifies that the digital code currently stored in the memory location can be over-written.

10. A television receiver embodying a teletext decoder as claimed in claim 2.

11. A television receiver embodying a teletext decoder as claimed in claim 3.

12. A television receiver embodying a teletext decoder as claimed in claim 4.

13. A television receiver embodying a teletext decoder as claimed in claim 6.

14. A television receiver embodying a teletext decoder as claimed in claim 7.

15. A television receiver embodying a teletext decoder as claimed in claim 8.

16. A television receiver embodying a teletext decoder as claimed in claim 9.

* * * * *